United States Patent
Bradley et al.

(10) Patent No.: US 9,586,300 B2
(45) Date of Patent: Mar. 7, 2017

(54) AUXILIARY MILLING UNIT FOR A MILLING MACHINE

(71) Applicant: THE BOEING COMPANY, Chicago, IL (US)

(72) Inventors: James S. Bradley, Arlington, WA (US); Michael Steven Lewis, Lake Forest Park, WA (US)

(73) Assignee: The Boeing Company, Chicago, IL (US)

( * ) Notice: Subject to any disclaimer, the term of this patent is extended or adjusted under 35 U.S.C. 154(b) by 124 days.

(21) Appl. No.: 14/606,204

(22) Filed: Jan. 27, 2015

(65) Prior Publication Data

US 2016/0214220 A1   Jul. 28, 2016

(51) Int. Cl.
| | |
|---|---|
| *B23C 1/08* | (2006.01) |
| *B23Q 1/70* | (2006.01) |
| *B23Q 37/00* | (2006.01) |
| *B23Q 5/04* | (2006.01) |
| *B23C 1/04* | (2006.01) |
| *B23Q 5/22* | (2006.01) |
| *B23C 1/06* | (2006.01) |

(Continued)

(52) U.S. Cl.
CPC ............... *B23Q 1/706* (2013.01); *B23C 1/04* (2013.01); *B23C 1/06* (2013.01); *B23C 1/08* (2013.01); *B23Q 1/621* (2013.01); *B23Q 5/043* (2013.01); *B23Q 5/225* (2013.01); *B23Q 37/00* (2013.01); *B23Q 2039/002* (2013.01); *B23Q 2039/006* (2013.01); *Y10T 409/307784* (2015.01); *Y10T 409/308344* (2015.01)

(58) Field of Classification Search
CPC . Y10T 409/308344; Y10T 409/307784; Y10T 409/307168; B23Q 2039/006; B23Q 2039/002; B23Q 2039/02; B23Q 2039/021; B23Q 1/72; B23Q 5/225; B23C 1/04; B23C 1/08; B23C 1/10
USPC ........................................ 29/26 A; 409/230
See application file for complete search history.

(56) References Cited

U.S. PATENT DOCUMENTS

| | | | | |
|---|---|---|---|---|
| 3,413,893 A | * | 12/1968 | Wilson ....................... | B23C 1/12 409/201 |
| 5,980,172 A | * | 11/1999 | Shoda ................... | B23B 31/263 144/1.1 |
| 6,099,449 A | * | 8/2000 | Geiger ...................... | B23Q 1/70 408/46 |

FOREIGN PATENT DOCUMENTS

| | | | | |
|---|---|---|---|---|
| CA | 1158084 A | * | 12/1983 | ............. B23C 1/002 |
| DE | 1477215 A1 | * | 3/1969 | ............... B23Q 1/70 |
| DE | 102009058649 | * | 6/2011 | ............. B23B 3/065 |

(Continued)

OTHER PUBLICATIONS

Machine translation of DE 102009058649, printed Jul. 2016.*

(Continued)

*Primary Examiner* — Daniel Howell
(74) *Attorney, Agent, or Firm* — Jay J. Hoette; The Small Patent Law Group, LLC

(57) ABSTRACT

An auxiliary milling unit configured to be coupled to a movable main milling unit of a milling machine includes an auxiliary milling tool and a mounting portion configured to couple the auxiliary milling unit to the main milling unit. The mounting portion is movable with the main milling unit. An auxiliary movement assembly is coupled to the mounting portion and the auxiliary milling tool. The auxiliary movement assembly is movable relative to the mounting portion to move the auxiliary milling tool relative to the main milling unit.

20 Claims, 3 Drawing Sheets

(51) Int. Cl.
*B23Q 1/62* (2006.01)
*B23Q 39/00* (2006.01)

(56) References Cited

FOREIGN PATENT DOCUMENTS

| DE | 102010024655 | * | 12/2011 | ............ B23B 29/24 |
|----|--------------|---|---------|-------------------------|
| GB | 989795 A | * | 4/1965 | ............... B23C 1/00 |
| JP | 60044206 A | * | 3/1985 | |
| JP | 11114759 A | * | 4/1999 | |
| JP | 2002331433 A | * | 11/2002 | |
| JP | 2009166202 A | * | 7/2009 | |
| JP | 2009166204 A | * | 7/2009 | |

OTHER PUBLICATIONS practicalmachinist.com; Driling tiny, deep hole; http://www.practicalmachinist.com/vb/cnc-machining/drilling-tiny-deep-holes-267741/; Jun. 22, 2013.

* cited by examiner

AUXILIARY MILLING UNIT FOR A MILLING MACHINE

BACKGROUND

The present disclosure relates generally to auxiliary milling units for milling machines.

Conventional milling machines, such as computer numeric control (CNC) milling machines, includes a main spindle holding a milling tool that is used to perform machining operations, such as milling holes. The main spindle is supported by, and moved by, a movement assembly, such as a carriage, an arm, and the like, to position the milling tool above a workpiece for machining. In some applications, holes are milled in the workpiece using the milling tool. The main spindle is moved in a circular motion by the movement assembly to bore and enlarge the hole to the desired diameter.

However, when making relatively small features such as holes, the movement assembly is unable to move quickly enough to move the main spindle to accurately bore the hole. For example, due to the large mass of the main spindle and movement assembly, small movements, such as the circular motion to bore out the holes, are difficult to control accurately when performed quickly. As such, when performed quickly, the holes may be oblong. Furthermore, the small movements wear the milling machines over time, which are expensive to repair or replace.

One solution to improving the accuracy of machining the holes is to slow down the milling process. However, while improving the accuracy of the machining, slowing down the boring process adds additional machining time and reduces throughput. Another solution to machining the holes in the workpiece is to use separate milling machines or different milling tools to make the different sized holes. However, providing different milling machines is expensive and requires a large amount of floor space in the manufacturing facility. Additionally, the workpiece may need to be moved to the various machines, which adds time and labor to the machining process. Using different milling tools requires changing out the milling tools which creates a significant amount of machine time for the change out. For instance, in one example, three different size holes are made in the workpiece. The milling tool change may be approximately 1 minute for each milling tool adding significant time to machine the workpiece.

A need remains for a milling machine capable of machining a workpiece in a cost effective and reliable manner.

SUMMARY

In accordance with one embodiment, an auxiliary milling unit is provided that is configured to be coupled to a movable main milling unit of a milling machine. The auxiliary milling unit includes an auxiliary milling tool and a mounting portion configured to couple the auxiliary milling unit to the main milling unit. The mounting portion is movable with the main milling unit. An auxiliary movement assembly is coupled to the mounting portion and the auxiliary milling tool. The auxiliary movement assembly is movable relative to the mounting portion to move the auxiliary milling tool relative to the main milling unit.

In another embodiment, a milling machine is provided including a frame and a main milling unit having a main movement assembly movably coupled to the frame. The main milling unit has a main spindle coupled to, and movable with, the main movement assembly. The main milling unit has a main milling tool coupled to, and rotated by, the main spindle for milling holes in a workpiece. The milling machine includes an auxiliary milling unit having an auxiliary movement assembly coupled to, and movable with, the main milling unit. The auxiliary movement assembly is movable relative to the main milling unit. The auxiliary milling unit has an auxiliary spindle coupled to, and movable with, the auxiliary movement assembly. The auxiliary milling unit has an auxiliary milling tool coupled to, and rotated by, the auxiliary spindle for milling holes in the workpiece. The auxiliary milling unit is operated independently from the main milling unit.

In a further embodiment, an auxiliary milling unit is provided for a computer numerical control (CNC) milling machine that includes a main milling tool movably positionable by a main movement assembly. The auxiliary milling unit includes an auxiliary milling tool in addition to the main milling tool of the CNC milling machine. The auxiliary milling unit includes an auxiliary movement assembly supporting the auxiliary milling tool. The auxiliary movement assembly is configured to be positioned by the main movement assembly relative to the workpiece. The auxiliary movement assembly moves the auxiliary milling tool in mutually perpendicular first and second directions relative to the main movement assembly to independently position the auxiliary milling tool relative to the main milling tool.

The features and functions that have been discussed can be achieved independently in various embodiments or may be combined in yet other embodiments, further details of which can be seen with reference to the following description and drawings.

DETAILED DESCRIPTION

Figure 1:
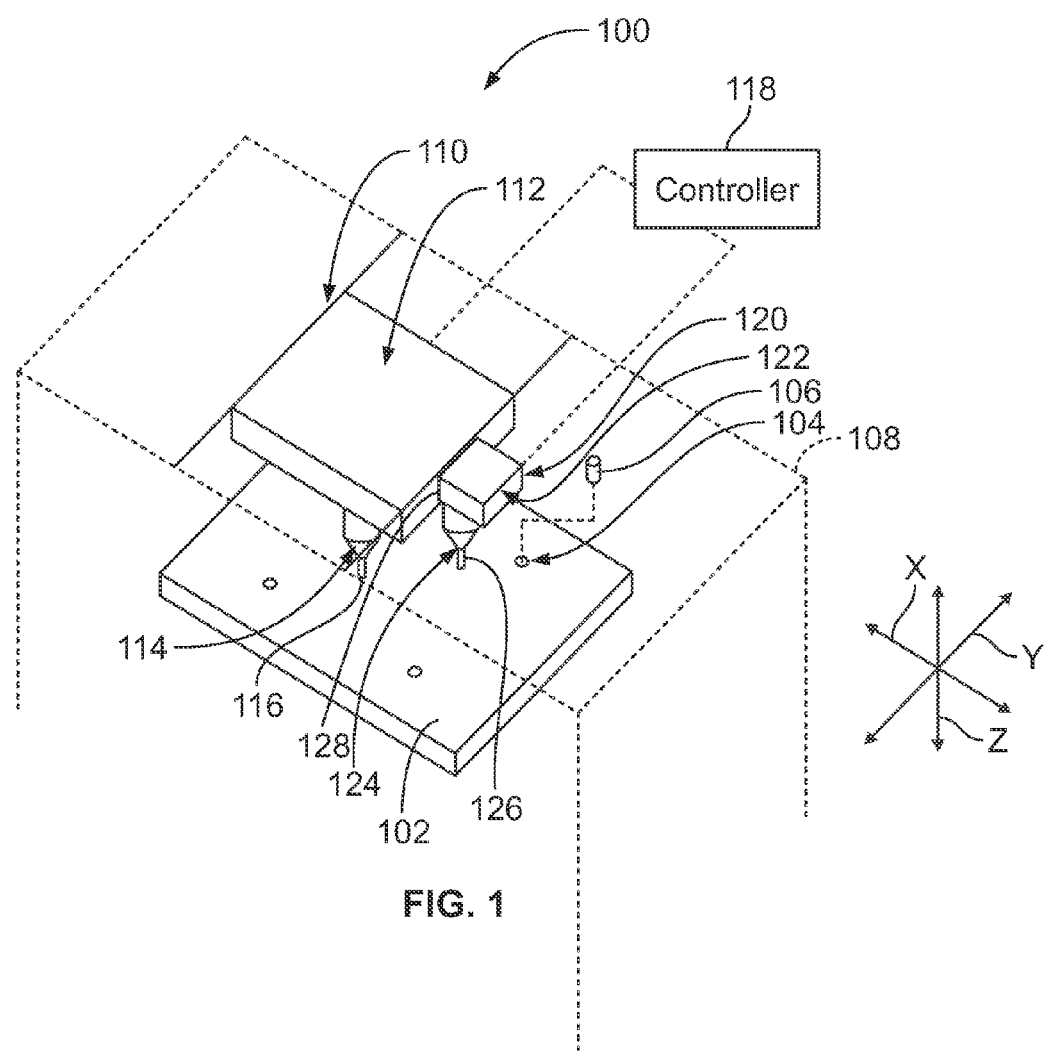
FIG. 1 is a schematic illustration of a milling machine in accordance with an exemplary embodiment.

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein are various embodiments of a milling machine for milling holes in a workpiece. The milling machine may be a computer numeric control (CNC) milling machine. The milling machine may include a main milling unit and an auxiliary milling unit, which may be independently operated from the main milling unit. The main milling unit may be used to Mill some holes while the auxiliary milling unit may be used to Mill different holes. In an exemplary embodiment, the auxiliary milling unit is mounted to and movable with the main milling unit. The main milling unit is used to position the auxiliary milling unit and the auxiliary milling unit is then used to finely position the associated auxiliary milling tool for milling the hole(s) or features.

FIG. 1 is a schematic illustration of a milling machine 100 in accordance with an exemplary embodiment. The milling machine 100 may be any type of milling machine used to make features such as holes 104 in a workpiece 102. The holes 104 may, but do not necessarily have to, extend entirely through the workpiece 102. The holes 104 may be circular; however the holes 104 may be elongated or have a non-circular shape in alternative embodiments. The milling machine 100 may be a computer numeric control (CNC) milling machine. For example, the milling machine 100 may be a carriage-type CNC milling machine, which may have a carriage-mounted milling unit that is movable relative to the workpiece 102 for positioning the milling tool and milling the holes 104 in the workpiece 102. The milling machine may be another type of CNC milling machine, such as a C-frame milling machine that receives the workpiece 102 therein. The milling machine 100 may support and move the milling tool(s) by structures other than a carriage in alternative embodiments, such as using a robotic arm or other supporting structure. The milling machine 100 may be enclosed and receive the workpiece therein or, alternatively, may be open sided to receive larger workpieces 102.

The workpiece 102 may be any type of workpiece. In various embodiments, the workpiece 102 is an aerospace workpiece, such as an interior panel of an aircraft, an exterior panel of an aircraft, a wing of an aircraft, and the like; however the subject matter described herein is not intended to be limited to such workpieces. The holes 104 Milled in the workpiece 102 may receive inserts 106, such as threaded inserts, which may receive fasteners. The holes may receive other components in alternative embodiments. The workpiece 102 may be a layered structure having layers of different materials stacked or sandwiched together. For example, the workpiece 102 may have a honeycomb structure layer sandwiched between fiberglass layers. The holes 104 may extend through one or more of the layers. The holes 104 are accurately Milled to a desired size and shape, such as to receive the inserts 106. The holes 104 may be cylindrical having a particular diameter; however other shapes are possible in alternative embodiments, including elongated holes, slots, keyholes, and the like.

The milling machine 100 includes a frame 108 that supports various components of the milling machine 100 and/or the workpiece 102. Optionally, the frame 108 may be stationary and mounted to a floor of a manufacturing facility. Alternatively, the frame 108 may be portable and mounted to the workpiece 102. The frame 108 may be box-shaped; however, the frame 108 may have other shapes in alternative embodiments, such as a C-shape or other shapes. The frame 108 may be defined by one or more frame members or pieces.

The milling machine 100 includes a main milling unit 110 having a main movement assembly 112 movably coupled to the frame 108. In various embodiments, the main movement assembly 112 may be a carriage-type movement assembly 112 supported by the frame 108 and movable in one or more directions, such as in three directions to position the components of the main milling unit 110 in three dimensional space. In alternative embodiments, the main movement assembly 112 may be a multi axis machines, such as a 3 axis machine, a 5 axis machine, a robotic arm or other type of movement assembly. The main milling unit 110 has a main spindle 114 coupled to, and movable with, the main movement assembly 112. The main milling unit 110 has a main milling tool 116 coupled to, and rotated by, the main spindle 114 configured for milling all, some or none of the holes 104 in the workpiece 102.

In an exemplary embodiment, operation of the main milling unit 110 is controlled by a controller 118. For example, the main milling unit 110 is computer numeric controlled by the controller 118. The controller 118 controls operation of the main movement assembly 112, such as by a computer executable program. The controller 118 controls operation of the main milling spindle 114, such as by a computer executable program. The main milling unit 110 is not limited to operation in a vertical orientation, but rather can be at other various orientations. Optionally, the main milling unit 110 may be oriented such that the main milling tool 116 is normal to the orientation of the feature or hole being milled. Alternatively, the main milling unit may be oriented to mill the hole 104 at an angle rather than normal to the main surface of the workpiece 102. Optionally, the orientation may change during operation. For example, the workpiece 102 may be curved rather than being flat, and the main milling unit 110 may be oriented during operation to follow the curved surface.

The milling machine 100 includes an auxiliary milling unit 120 having an auxiliary movement assembly 122 coupled to, and movable with, the main milling unit 110. The auxiliary movement assembly 122 is movable relative to the main milling unit 110. The auxiliary milling unit 120 has an auxiliary spindle 124 coupled to, and movable with, the auxiliary movement assembly 122. The auxiliary milling unit 120 has an auxiliary milling tool 126 coupled to, and rotated by, the auxiliary spindle 124 for milling all, some or none of the holes 104 in the workpiece 102. For example, the auxiliary milling tool 126 may mill all, some or none of the holes 104 in a particular workpiece 102, while the main milling tool 116 may mill all, some or none of the holes 104.

In an exemplary embodiment, the auxiliary milling unit 120 includes a mounting portion 128 configured to couple the auxiliary milling unit 120 to the main milling unit 110. For example, the mounting portion 128 may be a base or block that is securely coupled or fixed to a portion of the main milling unit 110. The mounting portion 128 is fixed to the main milling unit 110 such that the mounting portion 128 may be moved with the main milling unit 110. The mounting portion 128 may be coupled to the main movement assembly 112. The mounting portion 128 may be secured using fasteners, by welding or by other securing processes to couple the mounting portion 128 to the main milling unit 110. By coupling the mounting portion 128 to the main milling unit 110, the auxiliary milling unit 120 is movable with the main milling unit 110. When the main milling unit 110 is stopped or positioned, the auxiliary milling unit 120 may be operated to move the auxiliary milling tool 126 relative to the mounting portion 128 to more precisely Mill the holes 104. Optionally, the main milling unit 110 may have a greater range of motion than the auxiliary milling unit 120. For example, in some various embodiments, the main movement assembly 112 may be able to move the auxiliary milling tool 126 in an area approximately 8'×4', whereas the auxiliary movement assembly 122 may be able to move the auxiliary milling tool 126 in an area approximately 1'×1'.

In an exemplary embodiment, operation of the auxiliary milling unit 120 is controlled by the controller 118. The auxiliary milling unit 120 is computer numeric controlled by the controller 118. The controller 118 controls operation of the auxiliary movement assembly 122, such as by a computer executable program. The controller 118 controls operation of the auxiliary milling spindle 124, such as by a computer executable program. The controller 118 may have a single control module for operating the main and auxiliary milling units 110, 120. Alternatively, the controller 118 may have separate control modules for the main and auxiliary milling units 110, 120. The controller 118 may have different control module(s) for the movement assemblies 112, 122 and different control module(s) for the spindles 114, 124. The controller 118 may have different control modules for controlling X positioning, Y positioning and Z positioning along mutually perpendicular X, Y and Z-axes, respectively, which are identified in FIG. 1. The Z-axis may be oriented along a vertical direction in various embodiments.

During operation of the milling machine 100, the main movement assembly 112 is used to position the main milling tool 116 relative to the frame 108 and the workpiece 102 for milling. The main movement assembly 112 may control 3-dimensional positioning of the main milling tool 116. For example, the main movement assembly 112 may control X and Y location positioning of the main milling tool 116 above the workpiece 102 and the main movement assembly 112 may control Z depth positioning of the main milling tool 116. Optionally, the main movement assembly 112 may control boring or routing of the holes 104 to control the diameter or shape of the holes 104. For example, the main milling tool 116 may be a ¼" bit and the main movement assembly 112 may be used to enlarge the hole 104 to a larger diameter hole, such as a 1" hole by circling or moving the main milling tool 116 in the hole 104 in X and/or Y directions to enlarge the hole 104. Other types of milling tools may be provided in alternative embodiments.

The auxiliary milling unit 120 is operated independently from the main milling unit 110. For example, the auxiliary milling tool 126 may be operated (e.g., rotated) independently of, such as at different times than, the main milling tool 116. The auxiliary movement assembly 122 may be operated independently of the main movement assembly 112, such as to position the auxiliary milling tool 126 independently of the main milling tool 116. The auxiliary movement assembly 122 moves the auxiliary milling tool 126 in mutually perpendicular first and second directions along the X and Y axes relative to the main movement assembly 112 to independently position the auxiliary milling tool 126 relative to the main milling tool 116. The auxiliary milling unit 120 may be operated to mill different types of holes than the main milling unit 110. The auxiliary milling unit 120 may be operated in lieu of the main milling unit 110 in some situations, such as for more accurate milling, for smaller diameter holes, for holes having tighter tolerances, and/or for reduced wear on the main milling unit 110. The auxiliary milling unit 120 is not limited to operation in a vertical orientation, but rather can be at other various orientations. Optionally, the auxiliary milling unit 120 may be oriented, such as by the main milling unit 110, such that the auxiliary milling tool 126 is normal to the orientation of the feature or hole being milled. Alternatively, the auxiliary milling unit 120 may be oriented to mill the hole 104 at an angle rather than normal to the main surface of the workpiece 102. Optionally, the orientation may change during operation. For example, the workpiece 102 may be curved rather than being flat, and the auxiliary milling unit 120 may be oriented during operation to follow the curved surface.

During operation of the milling machine 100, the main movement assembly 112 is used to generally position the auxiliary milling unit 120, which is moved with the main movement assembly 112. For example, the main movement assembly 112 is used to coarsely position the auxiliary milling tool 126 relative to the frame 108 and the workpiece 102 for milling, such as to a set point, which may be a center point of the corresponding hole 104 that the auxiliary milling tool 126 is used to form. The auxiliary movement assembly 122 may then finely position the auxiliary milling tool 126 relative to the frame 108 and the workpiece 102, such as for further positioning prior to milling or for positioning during milling, such as for boring or routing of the hole 104. For example, the auxiliary movement assembly 122 may move the auxiliary milling tool 126 in a precise path, such as in a circular motion, within the hole 104 while the mounting portion 128 remains at the course or set position. As such, the hole 104 may be enlarged or precisely dimensioned by the operation of the auxiliary movement assembly 122.

The main movement assembly 112 may control positioning of the auxiliary milling tool 126. For example, the main movement assembly 112 may control X and Y location positioning of the auxiliary milling tool 126 above the workpiece 102 and/or may control Z depth positioning of the auxiliary milling tool 126. Additionally, the auxiliary movement assembly 122 may control positioning of the auxiliary milling tool 126. For example, after the main movement assembly 112 has coarsely positioned the auxiliary milling tool 126, the main movement assembly 112 may remain stationary and the auxiliary movement assembly 122 may finely control X and Y location positioning of the auxiliary milling tool 126 above the workpiece 102. Optionally, the auxiliary movement assembly 122 may move the auxiliary milling tool 126 to multiple mill locations while the mounting portion 128 and main movement assembly 112 remains set at the course position.

In various embodiments, the main movement assembly 112 may control Z depth positioning of the auxiliary milling tool 126, such as by moving the auxiliary movement assembly 122 along the Z-axis after the X and Y positions are set. In other various embodiments, the auxiliary movement assembly 122 may control Z depth positioning of the auxiliary milling tool 126, such as by moving the auxiliary milling tool 126 along the Z-axis after the X and Y positions are set.

Optionally, the auxiliary movement assembly 122 may control milling of the holes 104 to control the diameter or shape of the holes 104. For example, the auxiliary milling tool 126 may be a ¼" bit and the auxiliary movement assembly 122 may be used to enlarge the hole 104 to a larger diameter hole, such as a 1" hole by circling or moving the auxiliary milling tool 126 in the hole 104 in X and/or Y directions to enlarge the hole 104.

Figure 2:
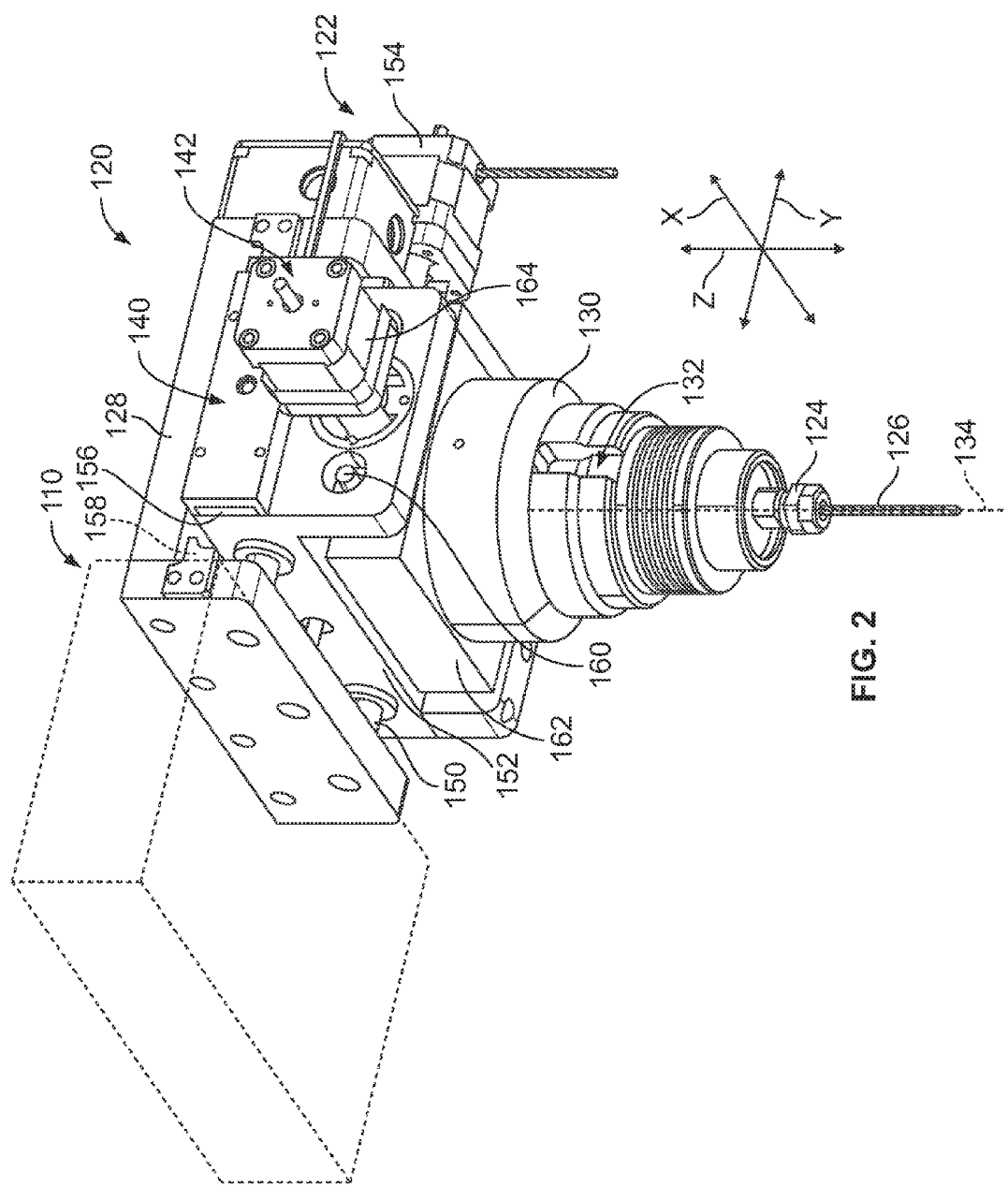
FIG. 2 is a perspective view of an auxiliary milling unit of the milling machine shown in FIG. 1 formed in accordance with an exemplary embodiment.
Figure 3:
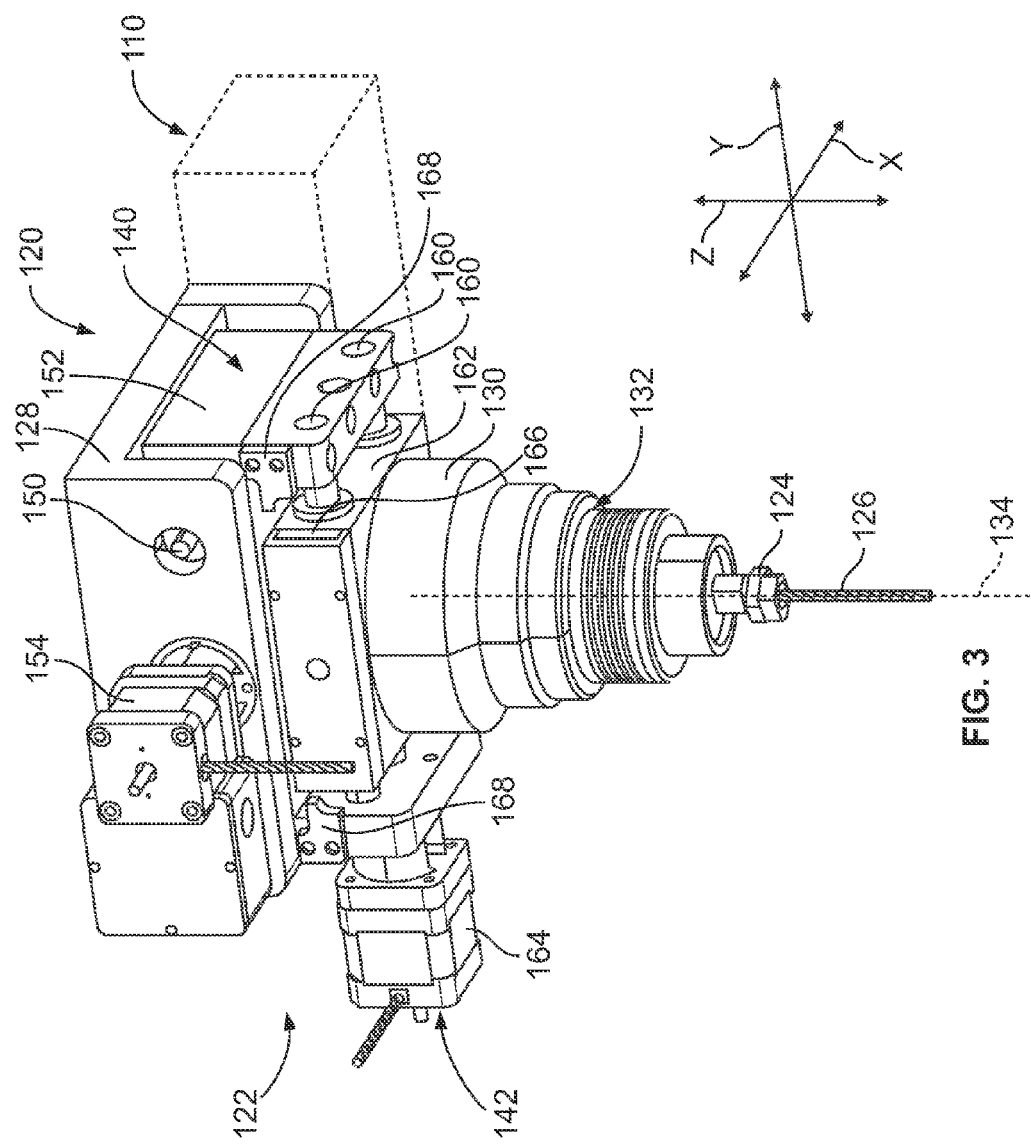
FIG. 3 is another perspective view of the auxiliary milling unit in accordance with an exemplary embodiment.

FIG. 2 is a perspective view of the auxiliary milling unit 120 in accordance with an exemplary embodiment. FIG. 3 is another perspective view of the auxiliary milling unit 120 in accordance with an exemplary embodiment. The mounting portion 128 is illustrated in FIGS. 2 and 3 coupled to a corresponding mounting location of the main milling unit 110 (shown in phantom). The auxiliary milling tool 126 is variably positionable relative to the mounting portion 128, which in an exemplary embodiment is fixed relative to the main milling unit 110.

The auxiliary milling unit 120 includes a motor housing 130 surrounding an auxiliary motor 132 used to rotate the auxiliary spindle 124 about a rotation axis 134. The auxiliary milling tool 126 is coupled to the auxiliary spindle 124. Optionally, the auxiliary milling tool 126 is removable from the auxiliary spindle 124 and replaceable, such as after wear or with a differently sized and/or shaped tool. The auxiliary motor 132 is operably coupled to the controller 118 (shown in FIG. 1), such as via a cable. The controller 118 controls operation of the auxiliary motor 132, and thus rotation of the auxiliary spindle 124 and auxiliary milling tool 126. The auxiliary motor 132 may be operated independently of operation of the main milling unit 110.

In an exemplary embodiment, the auxiliary movement assembly 122 includes a plurality of movement units that control movement in different directions, such as in mutually perpendicular X, Y and/or Z directions. In various embodiments, the auxiliary movement assembly 122 includes a first movement unit 140 configured to move the auxiliary milling tool 126 in a first direction, such as along the X-axis, which may define a first axis. The auxiliary movement assembly 122 includes a second movement unit 142 configured to move the auxiliary milling tool 126 in a second direction, which may be generally perpendicular to the first direction, such as along the Y-axis, which may define a second axis. In other various embodiments, the auxiliary movement assembly 122 may include a third movement unit (not shown) configured to move the auxiliary milling tool 126 in a third direction, which may be along a third axis, such as the Z-axis.

In an exemplary embodiment, the first movement unit 140 is directly supported by, and moveable along the X-axis relative to, the mounting portion 128. The second movement unit 142 is directly supported by the first movement unit 140 and moves with the first movement unit 140 relative to the mounting portion 128. The second movement unit 142 is movable along the Y-axis relative to the first movement unit 140 and the mounting portion 128. In an exemplary embodiment, the auxiliary milling tool 126 is directly supported by the second movement unit 142. For example, the motor housing 130 may be part of or extend from a portion of the second movement unit 142 such that the auxiliary motor 132 and auxiliary spindle 124 are directly supported by the second movement unit 142.

The movement units 140, 142 may be any type of units capable of moving the auxiliary milling tool 126. In the illustrated embodiment, the movement units 140, 142 are slide-type units that use actuators to slide the components in linear X and Y directions to position the auxiliary milling tool 126. For example, the first movement unit 140 includes first rails 150 and a first slide 152 that slides along the first rails 150. The first rails 150 may be held by the mounting portion 128, such as between end walls of the mounting portion 128, such that the first slide 152 moves relative to the mounting portion 128. A first actuator 154 is operably coupled to the first slide 152 and causes the first slide 152 to slide linearly along the X-axis. In the illustrated embodiment, the first actuator 154 is a servo motor; however other types of actuators may be used in alternative embodiments, such as other types of electrical actuators including, but not limited to, a stepper motor, a voice coil and the like; a hydraulic actuator; a pneumatic actuator; and the like. The first actuator 154 is operably coupled to the controller 118, such as via a cable. The controller 118 controls operation of the first actuator 154, and thus the position of the auxiliary milling tool 126. The first actuator 154 may be operated independently of operation of the main movement assembly 112 of the main milling unit 110. Optionally, the first movement unit 140 may include limit switches 156 to limit over-travel of the first movement unit 140. Actuating features 158 may be attached to the mounting portion 128 to activate the limit switches 156.

Similarly, in the illustrated embodiment, the second movement unit 142 includes second rails 160 and a second slide 162 that slides along the second rails 160. The second rails 160 may be held by the first slide 152, such as between end walls of the first slide 152, such that the second slide 162 moves relative to the first movement unit 140. A second actuator 164 is operably coupled to the second slide 162 and causes the second slide 162 to slide linearly along the Y-axis. In the illustrated embodiment, the second actuator 164 is a servo motor; however other types of actuators may be used in alternative embodiments, such as other types of electrical actuators including, but not limited to, a stepper motor, a voice coil and the like; a hydraulic actuator; a pneumatic actuator; and the like. The second actuator 164 is operably coupled to the controller 118, such as via a cable. The controller 118 controls operation of the second actuator 164, and thus the position of the auxiliary milling tool 126. The second actuator 164 may be operated independently of operation of the main movement assembly 112 of the main milling unit 110 and independently of operation of the first movement unit 140. Optionally, the second movement unit 142 may include limit switches 166 to limit over-travel of the second movement unit 142. Contactors 168 may be attached to the first slide 152 to activate the limit switches 166.

Optionally, an additional movement unit may be provided that moves the auxiliary milling tool 126 along the Z-axis. Such movement unit may move the first and/or second movement units 140, 142, or alternatively may be supported by the second movement unit 142 and only move the auxiliary spindle 124 and associated motor 132. However, in other various embodiments, the auxiliary movement assembly 122 may be provided without the additional movement unit. In such embodiments, the depth or Z-axis movement may be controlled using the main movement assembly 112 (shown in FIG. 1) to control the depth of milling. Eliminating the additional movement unit may reduce the weight of the auxiliary milling unit 120 and/or provide enhanced performance and higher quality milling. For example, the first and second movement units 140, 142 may be able to more accurately and easily move the auxiliary milling tool 126 without the additional movement unit. Wear on the auxiliary milling unit 120 may thus be reduced. Smaller, and thus cheaper, movement units 140, 142 may be used if the auxiliary movement assembly 122 is lighter in weight.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

What is claimed is:

1. An auxiliary milling unit configured to be coupled to a movable main milling unit of a milling machine, the auxiliary milling unit comprising:
   an auxiliary milling tool;
   a mounting portion configured to couple the auxiliary milling unit to the main milling unit, the mounting portion being movable with the main milling unit; and
   an auxiliary movement assembly coupled to the mounting portion and the auxiliary milling tool, the auxiliary movement assembly being movable relative to the mounting portion to move the auxiliary milling tool relative to the main milling unit, wherein the auxiliary movement assembly comprises a first movement unit configured to move the auxiliary milling tool in a first direction, the auxiliary movement assembly comprising a second movement unit configured to move the auxiliary milling tool in a second direction generally perpendicular to the first direction.

2. The auxiliary milling unit of claim 1, further comprising an auxiliary motor rotating an auxiliary spindle, the auxiliary milling tool being coupled to the auxiliary spindle.

3. The auxiliary milling unit of claim 1, wherein the auxiliary milling tool is operated independently of operation of the main milling unit.

4. The auxiliary milling unit of claim 1, wherein the auxiliary movement assembly and auxiliary milling tool are coupled to a controller used to control the main milling unit, the controller controlling positioning of the auxiliary movement assembly and controlling rotation of the auxiliary milling tool.

5. An auxiliary milling unit configured to be coupled to a movable main milling unit of a milling machine, the auxiliary milling unit comprising:
   an auxiliary milling tool;
   a mounting portion configured to couple the auxiliary milling unit to the main milling unit, the mounting portion being movable with the main milling unit; and
   an auxiliary movement assembly coupled to the mounting portion and the auxiliary milling tool, the auxiliary movement assembly being movable relative to the mounting portion to move the auxiliary milling tool relative to the main milling unit;
   wherein the auxiliary movement assembly and auxiliary milling tool are coupled to a controller used to control the main milling unit, the controller controlling positioning of the auxiliary movement assembly and controlling rotation of the auxiliary milling tool, the mounting portion is moveable by the controller in mutually perpendicular first and second directions with the main milling unit to a course position, the controller causing the auxiliary movement assembly to move the auxiliary milling tool to a fine position while the mounting portion remains at the course position.

6. The auxiliary milling unit of claim 5, wherein the auxiliary movement assembly moves the auxiliary milling tool to multiple mill locations while the mounting portion remains at the course position.

7. The auxiliary milling unit of claim 5, wherein the auxiliary movement assembly moves the auxiliary milling tool in a circular motion while the mounting portion remains at the course position.

8. An auxiliary milling unit configured to be coupled to a movable main milling unit of a milling machine, the auxiliary milling unit comprising:
   an auxiliary milling tool;
   a mounting portion configured to couple the auxiliary milling unit to the main milling unit, the mounting portion being movable with the main milling unit; and
   an auxiliary movement assembly coupled to the mounting portion and the auxiliary milling tool, the auxiliary movement assembly being movable relative to the mounting portion to move the auxiliary milling tool relative to the main milling unit;
   wherein the auxiliary movement assembly moves the auxiliary milling tool in mutually perpendicular first and second directions while the mounting portion remains stationary.

9. The auxiliary milling unit of claim 8, wherein the mounting portion is moveable with the main milling unit in a mutually perpendicular third direction to control a depth of milling.

10. The auxiliary milling unit of claim 8, wherein the auxiliary movement assembly moves the auxiliary milling tool in a mutually perpendicular third direction to control a depth of milling.

11. The auxiliary milling unit of claim 1, wherein the first and second movement units comprise actuators coupled to slides, the actuators causing the slides to move in linear directions to position the auxiliary milling tool.

12. The auxiliary milling unit of claim 1, wherein the first movement unit is directly supported by, and moveable along a first axis relative to, the mounting portion, the second movement unit is directly supported by the first movement unit, the second movement unit being moveable along a second axis different than the first axis relative to the mounting portion, the auxiliary milling tool being directly supported by the second movement unit.

13. A milling machine comprising:
   a frame;
   a main milling unit having a main movement assembly movably coupled to the frame, the main milling unit having a main spindle coupled to, and movable with, the main movement assembly, the main milling unit having a main milling tool coupled to, and rotated by, the main spindle for milling holes in a workpiece; and
   an auxiliary milling unit having a mounting portion coupled to the main milling unit, the mounting portion being movable with the main milling unit, the auxiliary milling unit having an auxiliary movement assembly coupled to, and movable with, the mounting portion and the main milling unit, the auxiliary movement assembly being movable relative to the main milling unit, the auxiliary milling unit having an auxiliary spindle coupled to, and movable with, the auxiliary movement assembly, the auxiliary milling unit having an auxiliary milling tool coupled to, and rotated by, the auxiliary spindle for milling holes in the workpiece, wherein the auxiliary milling unit is operated independently from the main milling unit;
   wherein the mounting portion is moveable in mutually perpendicular first and second directions with the main milling unit to a course position, the auxiliary movement assembly moving the auxiliary milling tool to a fine position while the mounting portion remains at the course position.

14. The milling machine of claim 13, further comprising a controller, the main milling unit being operably coupled to the controller, the auxiliary milling unit being operably coupled to the controller, the controller independently controlling operation of the main milling unit and the auxiliary milling unit.

15. The milling machine of claim 14, wherein the controller operably controls the auxiliary movement assembly independently of the main movement assembly such that the auxiliary movement assembly is configured to position the auxiliary milling tool even when the main movement assembly is stationary.

16. A milling machine comprising:
a frame;
a main milling unit having a main movement assembly movably coupled to the frame, the main milling unit having a main spindle coupled to, and movable with, the main movement assembly, the main milling unit having a main milling tool coupled to, and rotated by, the main spindle for milling holes in a workpiece; and
an auxiliary milling unit having an auxiliary movement assembly coupled to, and movable with, the main milling unit, the auxiliary movement assembly being movable relative to the main milling unit, the auxiliary milling unit having an auxiliary spindle coupled to, and movable with, the auxiliary movement assembly, the auxiliary milling unit having an auxiliary milling tool coupled to, and rotated by, the auxiliary spindle for milling holes in the workpiece, wherein the auxiliary milling unit is operated independently from the main milling unit;
wherein the auxiliary movement assembly comprises a first movement unit configured to move the auxiliary milling tool in a first direction, the auxiliary movement assembly comprising a second movement unit configured to move the auxiliary milling tool in a second direction generally perpendicular to the first direction.

17. An auxiliary milling unit for a computer numerical control (CNC) milling machine that includes a main milling tool movably positionable by a main movement assembly, the auxiliary milling unit comprising:
an auxiliary milling tool in addition to the main milling tool of the CNC milling machine; and
an auxiliary movement assembly supporting the auxiliary milling tool, the auxiliary movement assembly being configured to be positioned by the main movement assembly relative to the workpiece, the auxiliary movement assembly moving the auxiliary milling tool in mutually perpendicular first and second directions relative to the main movement assembly to independently position the auxiliary milling tool relative to the main milling tool.

18. The milling machine of claim 13, wherein the auxiliary spindle has less mass than the main spindle.

19. The milling machine of claim 13, wherein the auxiliary movement assembly moves the auxiliary milling tool to multiple mill locations while the mounting portion remains at the course position.

20. The milling machine of claim 13, wherein the auxiliary movement assembly moves the auxiliary milling tool in a circular motion while the mounting portion remains at the course position.

* * * * *